United States Patent
Sakamoto et al.

(10) Patent No.: US 12,125,967 B2
(45) Date of Patent: Oct. 22, 2024

(54) METHOD FOR SUPPRESSING METAL PROPAGATION IN SOLID ELECTROLYTES

(71) Applicant: The Regents of The University of Michigan, Ann Arbor, MI (US)

(72) Inventors: Jeffrey Sakamoto, Ann Arbor, MI (US); Travis Thompson, Ann Arbor, MI (US); Asma Sharafi, Ypsilanti, MI (US); Nathan Taylor, Ann Arbor, MI (US); Neil P. Dasgupta, Ann Arbor, MI (US); Eric Kazyak, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 127 days.

(21) Appl. No.: 16/001,407

(22) Filed: Jun. 6, 2018

(65) Prior Publication Data
US 2019/0006707 A1    Jan. 3, 2019

Related U.S. Application Data

(60) Provisional application No. 62/515,676, filed on Jun. 6, 2017.

(51) Int. Cl.
*H01M 10/0562*    (2010.01)
*H01M 4/38*    (2006.01)
(Continued)

(52) U.S. Cl.
CPC ....... *H01M 10/0562* (2013.01); *H01M 4/382* (2013.01); *H01M 4/525* (2013.01);
(Continued)

(58) Field of Classification Search
CPC ................................. H01M 10/0562
See application file for complete search history.

(56) References Cited

U.S. PATENT DOCUMENTS

2007/0117007 A1    5/2007  Visco et al.
2011/0318650 A1*  12/2011  Zhang ............... H01M 10/0562
                                                   429/320
(Continued)

FOREIGN PATENT DOCUMENTS

CN    102044700    5/2011
CN    102522204    6/2012
(Continued)

OTHER PUBLICATIONS

Bohnke, et al., Mechanism of Ionic Conduction and Electrochemical Intercalation of Lithium into the Perovskite anthanum Lithium Titanate, Solid State Ionics, 1996, 91(1-2):21-31.
(Continued)

*Primary Examiner* — Jonathan G Jelsma
(74) *Attorney, Agent, or Firm* — Quarles & Brady LLP

(57) ABSTRACT

A method is disclosed for suppressing propagation of a metal in a solid state electrolyte during cycling of an electrochemical device including the solid state electrolyte and an electrode comprising the metal. One method comprises forming the solid state electrolyte such that the solid state electrolyte has a structure comprising a plurality of grains of a metal-ion conductive material and a grain boundary phase located at some or all of grain boundaries between the grains, wherein the grain boundary phase suppresses propagation of the metal in the solid state electrolyte during cycling. Another method comprises forming the solid state electrolyte such that the solid state electrolyte is a single crystal.

25 Claims, 12 Drawing Sheets

(51) Int. Cl.

| | | |
|---|---|---|
| *H01M 4/525* | (2010.01) | |
| *H01M 4/58* | (2010.01) | |
| *H01M 10/052* | (2010.01) | |
| *H01M 10/0525* | (2010.01) | |
| *H01M 10/058* | (2010.01) | |

(52) U.S. Cl.
CPC ....... *H01M 4/5825* (2013.01); *H01M 10/052* (2013.01); *H01M 10/0525* (2013.01); *H01M 10/058* (2013.01); *H01M 2300/0071* (2013.01)

(56) References Cited

U.S. PATENT DOCUMENTS

| | | |
|---|---|---|
| 2012/0231350 A1 | 9/2012 | Nishida et al. |
| 2014/0193695 A1 | 7/2014 | Hoshina et al. |
| 2014/0295286 A1 | 10/2014 | Badding et al. |
| 2016/0351879 A1 | 12/2016 | Visco et al. |
| 2017/0005367 A1* | 1/2017 | Van Berkel ........ H01M 10/0565 |
| 2018/0114977 A1 | 4/2018 | Sakamoto et al. |
| 2019/0088986 A1* | 3/2019 | Hu ...................... H01M 4/0423 |
| 2020/0052326 A1* | 2/2020 | Hu ..................... H01M 10/0562 |

FOREIGN PATENT DOCUMENTS

| | | | | |
|---|---|---|---|---|
| CN | 106848392 A | * | 6/2017 | |
| JP | 2014203595 | | 10/2014 | |
| JP | 2014203595 A | | 10/2014 | |
| WO | 2016069749 A1 | | 5/2016 | |
| WO | WO-2018089430 A1 | * | 5/2018 | .............. B01J 6/008 |

OTHER PUBLICATIONS

Cheng, et al., Intergranular Li Metal Propagation Through Polycrystalline Li6.25Al0.25La3Zr2O12 Ceramic Electrolyte, Electrochimica Acta, 2017, 223:85-91.

Han, et al., Negating Interfacial Impedance in Garnet-Based Solid-State Li Metal Batteries, Nature Materials, 2017, 16(5):572, 9 pages.

Ishiguro, et al., Stability of Nb-Doped Cubic Li7La3Zr2O12 with Lithium Metal, Journal of The Electrochemical Society, 2013, 160(10):A1690-A1693.

Kim, et al., Electrochemical Stability of Li6.5La3Zr1.5M0.5O12 (M=Nb or Ta) Against Metallic Lithium, Frontiers in Energy Research, 2016, vol. 4, Article 20, 7 pages.

Monroe, et al., The Impact of Elastic Deformation on Deposition Kinetics at Lithium/Polymer Interfaces, Journal of The Electrochemical Society, 2005, 152(2):A396-A404.

Ni, et al., Room Temperature Elastic Moduli and Vickers Hardness of Hot-Pressed LLZO Cubic Garnet, J. Mater. Sci., 2012, 47:7978-7985.

Ohta, et al., Grain Boundary Analysis of the Garnet-Like Oxides Li7+X-YLa3-xAxZr2-YNbYO12 (A=Sr or Ca), Frontiers in Energy Research, 2016, vol. 4, Article 30, 6 pages.

Ren, et al., Direct Observation of Lithium Dendrites Inside Garnet-Type Lithium-Ion Solid Electrolyte, Electrochemistry Communications, 2015, 57:27-30.

Sakamoto, Chapter 12: Super-ionic Conducting Oxide Electrolytes, Materials and Energy, vol. 6, Handbook of Solid State Batteries, Second Edition, 2016, pp. 391-414.

Sharafi, et al., Characterizing the Li—Li7La3Zr2O12 Interface Stability and Kinetics as a Function of Temperature and Current Density, Journal of Power Sources, 2016, 302:135-139.

Stramare, et al., Lithium Lanthanum Titanates: A Review, Chemistry of Materials, 2003, 15(21):3974-3990.

PCT International Search Report and Written Opinion, PCT/US2018/36254, dated Oct. 15, 2018, 21 pages.

Burton et al., Atomic Layer Deposition of MgO Using Bis(ethylcyclopentadienyl)magnesium and H2O, Journal of Physical Chemistry C, 2009, 113(5):1939-1946.

Kang et al., Growth Characteristics and Film Properties of Plasma-Enhanced and Thermal Atomic-Layer-Deposited Magnesium Oxide Thin Films Prepared Using Bis(ethylcyclopentadienyl)magnesium Precursor, Ceramics International, 2020, 46(8):10115-10120.

Miikkulainen et al., Crystallinity of Inorganic Films Grown by Atomic Layer Deposition: Overview and General Trends, Journal of Applied Physics, 2013, 113:021301, 101 pages.

Tsai et al., Li7La3Zr2O12 Interface Modification for Li Dendrite Prevention, ACS Applied Materials & Interfaces, 2016, 8(16):10617-10626.

Fu et al., "Toward garnet electrolyte-based Li metal batteries: An ultrathin, highly effective, artificial solid-state electrolyte/metallic Li interface", Sci. Adv. 2017;3: e1601659 Apr. 7, 2017.

Machine Translation of CN 102522204, NPL Year : 2012.
Machine Translation of CN 102044700, NPL Year : 2011.
Machine Translation of JP 2014203595, NPL Year : 2014.

* cited by examiner

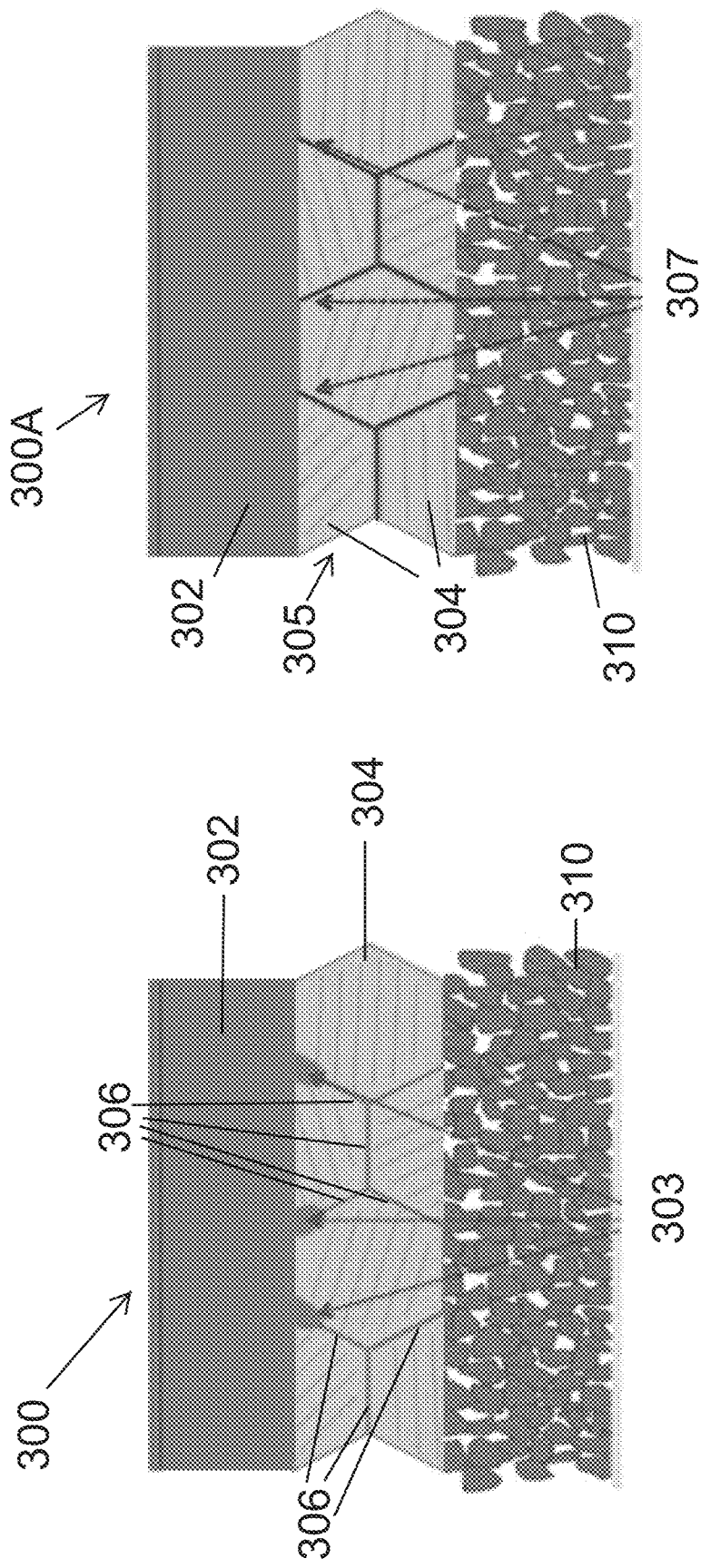

METHOD FOR SUPPRESSING METAL PROPAGATION IN SOLID ELECTROLYTES

CROSS-REFERENCES TO RELATED APPLICATIONS

This application claims priority from U.S. Patent Application No. 62/515,676 filed Jun. 6, 2017.

STATEMENT REGARDING FEDERALLY SPONSORED RESEARCH

This invention was made with government support under grant DE-EE0006821 awarded by the Department of Energy. The government has certain rights in the invention.

BACKGROUND OF THE INVENTION

1. Field of the Invention

This invention relates to electrochemical devices, such as lithium battery electrodes, lithium ion conducting solid state electrolytes, and solid-state lithium ion batteries including these electrodes and solid state electrolytes.

2. Description of the Related Art

Current state of the art lithium ion batteries comprise two electrodes (an anode and a cathode), a separator material that keeps the electrodes from touching but allows $Li^+$ ions through, and an electrolyte (which is an organic liquid with lithium salts). During charge and discharge, $Li^+$ ions are exchanged between the electrodes.

State-of-the-art Li-ion technology is currently used in low volume production plug-in hybrid and niche high performance vehicles; however, widespread adoption of electrified powertrains requires 25% lower cost, four times higher performance, and safer batteries without the possibility of fire. Thus, future energy storage demands safer, cheaper and higher performance means of energy storage.

One strategy is to develop solid state batteries, where the liquid electrolyte is replaced with a solid material that is conductive to $Li^+$ ions and can offer 3-4 times the energy density while reducing the battery pack cost by about 20%. Despite these attractive features, the fabrication and testing of solid state batteries for bulk scale applications, such as electric vehicles, has not been demonstrated.

Currently, the liquid electrolyte used in Li-ion batteries is not compatible with advanced battery concepts, such as the use of a lithium metal anode or high voltage cathodes. Furthermore, the liquid utilized in Li-ion batteries is flammable and susceptible to combustion upon thermal runaway. The use of a solid electrolyte to replace the liquid used in the battery enables advanced cell chemistries while simultaneously eliminating the risk of combustion. Several solid-electrolytes have been identified including nitrogen doped lithium phosphate (LiPON) or sulfide based glasses, and companies have been formed to commercialize these types of technologies. While progress has been made towards the performance of cells of these types, large scale manufacturing has not been demonstrated since LiPON must be vapor deposited and sulfide glasses form toxic $H_2S$ upon exposure to ambient air. Thus, special manufacturing techniques are required for those systems. Consequently, a different class of solid-electrolyte has been targeted: super conducting oxides.

Super conducting oxides have been proposed for use in a solid state electrolyte. Although several oxide electrolytes are reported in the literature, selection of a particular material is not trivial since several criteria must be simultaneously satisfied. The following metrics were identified on a combination of the state-of-the-art Li-ion battery technology baseline: (1) conductivity >0.2 mS/cm, comparable to state-of-the-art Li-ion battery technology, (2) negligible electronic conductivity, (3) electrochemical stability against high voltage cathodes and lithium metal anodes, (4) high temperature stability, (5) reasonable stability in ambient air and moisture, and (6) ability to be manufactured at thicknesses of <50 microns. Since then, it has been shown that $Li_7La_3Zr_2O_{12}$ (LLZO) can meet all of the criteria necessary for a solid-electrolyte outlined above.

For many years, lithium (Li) metal has been considered the "ideal" anode material because of its ability to store lightweight lithium in the metallic form without the need for an inactive host material or a conductive scaffold. This provides a capacity of 3860 mAh/g and the lowest theoretical anode potential, making it an enabling technology for next-generation battery systems including Li-sulfur and Li-air. Unfortunately, reactivity issues resulting from electrode-electrolyte interactions prevent extended cycling of lithium metal. These interactions lead to the formation of erratic dendritic structures that cause a reduction in Coulombic efficiency and eventual failure. These types of failure not only may shorten battery life but may also cause safety hazards as a result of gas evolution and possible ignition of the flammable electrolyte.

While myriad solid electrolytes exhibit fast ion conductivity (~1 mS/cm at 298K), few are stable against lithium metal [Refs. 2-4]. Garnet-type solid electrolyte, based on the nominal formula, $Li_7La_3Zr_2O_{12}$ (LLZO), is an example of a solid electrolyte that is a fast ion conductor and is believed to be stable against lithium. Moreover, because garnet-type Li-conductors are oxides, they exhibit relatively high elastic (~150 GPa) and shear (~60 GPa) moduli that could suppress the initiation and propagation of dendrites that have plagued previous generations of rechargeable batteries employing metallic lithium as the negative electrode [Ref. 5].

Though perhaps more applicable to amorphous polymers or glass ceramic electrolytes, a theory proposed by Monroe et al. [Ref. 6], establishes a criterion for metal filament initiation that is governed by the shear modulus of lithium and a solid electrolyte. Monroe et al. proposed that if the solid electrolyte shear modulus is greater than a factor of two higher than lithium (4.8 GPa at 298K), lithium filament initiation should not occur. Thus, because the shear modulus of LLZO is ~12 times higher than that of lithium, according to the Monroe et al. criterion, lithium filaments should not form.

Thus, one approach to mitigate the formation of dendrites involves the use of a solid electrolyte to physically stabilize the Li-electrolyte interface while allowing the facile transport of Li-ions. Though in principle this approach should work, it has been observed that at lithium deposition rates (comparable to what would be used in electric vehicles, microelectronics, and power tools), lithium metal can propagate through relatively hard ceramic electrolytes. Recent studies indicate that lithium filaments do indeed form in LLZO [Refs. 5-7]. For example, Sharafi et al. characterized the effect of current density and temperature on the formation of lithium filaments in solid-state Li-LLZO-Li cells [Ref. 7]. Macroscopically, dark features formed on the LLZO surface when the current density exceeded 0.1 mA/cm$^2$ at room temperature and 20 mA/cm$^2$ at 160° C. Inductive behavior in the electrochemical impedance spectroscopy (EIS) spectra after cycling indicated metallic shortcircuiting occurred. Similarly, Ren and Imanishi et al. confirmed the formation of dark features above comparable current densities at room temperature [Refs. 8-10].

Therefore, what is needed is a method for suppressing propagation of a metal (e.g., lithium) in a solid state electrolyte, such as $Li_7La_3Zr_2O_{12}$ (LLZO).

SUMMARY OF THE INVENTION

We directly observed the propagation of lithium metal through a promising polycrystalline solid electrolyte based on the garnet mineral structure $Li_7La_3Zr_2O_{12}$ (LLZO). Moreover, we observed that lithium preferentially deposits along grain boundaries (intergranularly). See FIG. 3C. This disclosure presents materials technology to suppress or eliminate metal (e.g., lithium) propagation in polycrystalline solid electrolytes.

In one aspect, the present disclosure provides a method for suppressing propagation of a metal in a solid state electrolyte during cycling of an electrochemical device including the solid state electrolyte and an electrode comprising the metal. The method includes the step of forming the solid state electrolyte such that the solid state electrolyte has a structure comprising a plurality of grains of a metal-ion conductive material and a grain boundary phase located at some or all of grain boundaries between the grains, wherein the grain boundary phase suppresses propagation of the metal in the solid state electrolyte during cycling.

In one version of the method, the grain boundary phase comprises an electrically insulating material. In another version of the method, the grain boundary phase comprises an ionically conductive material. In another version of the method, the grain boundary phase comprises an ionically resistive material. In another version of the method, the grain boundary phase is electrochemically stable at a $Li^+/Li^0$ redox potential or less. In another version of the method, the grain boundary phase increases a surface energy of the grain boundaries between the grains.

In the method, the electrode may comprise an anode, and the metal may be lithium. The metal may consist essentially of lithium, magnesium, sodium, or zinc. The grain boundary phase may comprise a metal oxide. The grain boundary phase may comprise a metal oxide selected from the group consisting of MgO, $Y_2O_3$, $La_2O_3$, $ZrO_2$, $Al_2O_3$, $Ga_2O_3$, $HfO_2$, $B_2O_3$, ZnO, $Er_2O_3$, and mixtures thereof. The structure of the solid state electrolyte may have a thickness of five grains or less. The metal-ion conductive material may comprise a ceramic material having a formula of $Li_wA_xM_2Re_{3-y}O_z$, wherein w is 5-7.5,
wherein A is selected from B, Al, Ga, In, Zn, Cd, Y, Sc, Mg, Ca, Sr, Ba, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75,
wherein z is 10.875-13.125, and
wherein the material has a garnet-type or garnet-like crystal structure.

The metal-ion conductive material can have the formula $Li_{6.25}La_{2.7}Zr_2Al_{0.25}O_{12}$. The metal-ion conductive material may comprise a material having any combination oxide or phosphate materials with a garnet, perovskite, NaSICON, or LiSICON phase.

In another aspect, the present disclosure provides a solid state electrolyte comprising: (i) a plurality of grains of a metal-ion conductive material, wherein the metal-ion conductive material comprises a ceramic material having a formula of $Li_wA_xM_2Re_{3-y}O_z$, wherein w is 5-7.5,
wherein A is selected from B, Al, Ga, In, Zn, Cd, Y, Sc, Mg, Ca, Sr, Ba, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75,
wherein z is 10.875-13.125, and
wherein the material has a garnet-type or garnet-like crystal structure; and
(ii) an electrically insulating grain boundary phase located at some or all of grain boundaries between the grains.

In one version of the solid state electrolyte, the metal-ion conductive material has the formula $Li_{6.25}La_{2.7}Zr_2Al_{0.25}O_{12}$, and the metal is lithium. In one version of the solid state electrolyte, the electrically insulating grain boundary phase comprises an ionically conductive material. In one version of the solid state electrolyte, the electrically insulating grain boundary phase comprises an ionically resistive material. In one version of the solid state electrolyte, the electrically insulating grain boundary phase is electrochemically stable at a $Li^+/Li^0$ redox potential or less. In one version of the solid state electrolyte, the electrically insulating grain boundary phase increases a surface energy of the grain boundaries. In one version of the solid state electrolyte, the electrically insulating grain boundary phase comprises a metal oxide. In one version of the solid state electrolyte, the grain boundary phase comprises a metal oxide selected from the group consisting of MgO, $Y_2O_3$, $La_2O_3$, $ZrO_2$, $Al_2O_3$, $Ga_2O_3$, $HfO_2$, $B_2O_3$, ZnO, $Er_2O_3$, and mixtures thereof.

In another aspect, the present disclosure provides an electrochemical device comprising: a cathode; the solid state electrolyte described above; and an anode comprising an electrochemically active metal such as lithium, magnesium, sodium, or zinc. The electrochemically active metal may comprise lithium. The anode may consist essentially of lithium metal. The cathode may comprise a lithium host material selected from the group consisting of lithium metal oxides wherein the metal is one or more of aluminum, cobalt, iron, manganese, nickel and vanadium, and lithium-containing phosphates having a general formula $LiMPO_4$ wherein M is one or more of cobalt, iron, manganese, and nickel.

In another aspect, the present disclosure provides a method of forming a solid state electrolyte. The method includes the step of sintering a metal oxide coated powdered metal-ion conductive material to form a solid state electrolyte. In the method, sintering may include compacting the solid state electrolyte. The metal oxide may comprise MgO, $Y_2O_3$, $La_2O_3$, $ZrO_2$, $Al_2O_3$, $Ga_2O_3$, $HfO_2$, $B_2O_3$, ZnO, $Er_2O_3$, or mixtures thereof. The metal-ion conductive material may comprises a ceramic material having a formula of $Li_wA_xM_2Re_{3-y}O_z$, wherein w is 5-7.5,
wherein A is selected from B, Al, Ga, In, Zn, Cd, Y, Sc, Mg, Ca, Sr, Ba, and any combination thereof,
wherein x is 0-2,
wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0-0.75, wherein z is 10.875-13.125, and wherein the material has a garnet-type or garnet-like crystal structure.

The metal-ion conductive material may have the formula $Li_{6.25}La_{2.7}Zr_2Al_{0.25}O_{12}$. The metal-ion conductive material may comprise a material having any combination oxide or phosphate materials with a garnet, perovskite, NaSICON, or LiSICON phase. The metal-ion may be an ion of lithium, magnesium, sodium, or zinc. The metal-ion may be an ion of lithium. In the method, sintering may occur at atmospheric pressure. The method may comprise the step of coating a powdered metal-ion conductive material using a technique selected from the group consisting of atomic layer deposition, physical vapor deposition, chemical vapor deposition, sol-gel chemistry, and solid-state reaction to create the metal oxide coated powdered metal-ion conductive material. In the method, sintering may occur at a temperature between 500° C. and 1500° C. In the method, the metal-ion conductive material may comprise grain boundaries and the metal oxide at least partially fills the grain boundaries.

In another aspect, the present disclosure provides a method of forming a solid state electrolyte. The method includes the steps of: (a) sintering a metal-ion conductive material to create a sintered metal-ion conductive material having a first surface and grain boundaries; and (b) heating a metal oxide on the first surface of the sintered metal-ion conductive material to at least partially fill the grain boundaries. The metal-ion may be an ion of lithium, magnesium, sodium, or zinc. The metal-ion conductive material may comprise a ceramic material having a formula of $Li_wA_xM_2Re_{3-y}O_z$, wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0-0.75, wherein z is 10.875-13.125, and wherein the material has a garnet-type or garnet-like crystal structure.

The metal-ion conductive material can have the formula $Li_{6.25}La_{2.7}Zr_2Al_{0.25}O_{12}$. The metal-ion can be an ion of lithium. The metal oxide can comprise MgO, $Y_2O_3$, $La_2O_3$, $ZrO_2$, $Al_2O_3$, $Ga_2O_3$, $HfO_2$, $B_2O_3$, ZnO, $Er_2O_3$, or mixtures thereof.

It is an advantage of the present disclosure to provide a method for modifying grain boundaries of a solid electrolyte material to prevent metal penetration during electrochemical reactions. The modification may make the grain boundaries electrical insulators. The modification may or may not make the grain boundaries ionically conducting. The chemistry of the modified grain boundaries may not be soluble in the solid electrolyte grains. The grain boundary modification can be electrochemically stable at or below the $Li^+/Li^0$ redox potential. The grain boundary modification can increase the surface energy of the lithium metal-polycrystalline solid electrolyte-grain boundary-polycrystalline solid electrolyte grain junction to suppress lithium metal propagation. The grain boundary modification can be interposed between grains first by coating solid electrolyte powder particles having one or more individual grains, followed by a densification using hot pressing or pressure-less sintering. The grain boundary modification can be deposited on solid electrolyte grains using techniques such as atomic layer deposition, physical vapor deposition, chemical vapor deposition, sol-gel chemistry, or solid-state reaction. Insoluble grain boundary modification can be doped into solid electrolyte grains during synthesis and exsoluted during solid electrolyte calcination or densification. The grain boundary modification can be made after densification by exposure to a liquid, gas, or vapor that reacts with grain boundaries to alter their chemistry to prevent metal penetration.

The method of the present disclosure improves stability and suppresses metal propagation degradation mechanisms in polycrystalline solid electrolytes. The method modifies grain boundaries in polycrystalline solid electrolytes (used, for example, in solid state lithium batteries) to prevent metal penetration during electrochemical reactions (an observed instability and degradation mechanism in such structures).

Bulk-scale all-solid-state batteries employing metallic lithium as the negative electrode have been developed, offering the potential to enable unprecedented performance, durability, and safety in lithium batteries for electric vehicles. However, an instability leading to degradation of battery performance has recently been observed in an otherwise promising type of these solid-state batteries, which use a relatively hard, solid ceramic electrolyte meant to physically prevent such instability. The cause of this instability is metallic lithium propagation and deposition through the solid ceramic electrolyte, which was pinpointed as occurring through/along grain boundaries and is described within this disclosure. The method of the present disclosure is an intentional modification of these grain boundaries to suppress and potentially eliminate intergranular lithium propagation. Well-defined target material behaviors and guidelines for designing embodiments of the modified grain boundaries, along with methods for their reduction to practice, have been presented herein.

The present invention has application in solid-state batteries, particularly those based on polycrystalline metal oxide materials. The methods and devices of the present disclosure enhance stability by suppressing degradation of these solid oxide electrolyte solid-state batteries and improve their charging rates.

This disclosure presents another materials technology to suppress or eliminate lithium metal propagation in a solid electrolyte. The present disclosure provides an electrochemical cell comprising: a cathode; an anode comprising an electrochemically active metal such as lithium, magnesium, sodium, or zinc; and a solid-state electrolyte positioned between the cathode and the anode, wherein the solid-state electrolyte comprises a single crystal of a solid electrolyte material. The solid electrolyte material may be selected from the group consisting of oxide materials with the garnet phase. The solid electrolyte material can have the formula $Li_uRe_vM_wA_xO_y$, wherein:

Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;

u can vary from 3-7.5;

v can vary from 0-3;

w can vary from 0-2;

x can vary from 0-2; and y can vary from 11-12.5.

In one embodiment, the solid electrolyte material is a lithium lanthanum zirconium oxide having the formula $Li_{6.25}La_3Zr_2Al_{0.25}O_{12}$. The anode can comprise lithium metal. The anode can consist essentially of lithium, magnesium, sodium, or zinc. The cathode can comprise a lithium host material selected from the group consisting of lithium metal oxides wherein the metal is one or more of aluminum, cobalt, iron, manganese, nickel and vanadium, and lithium-containing phosphates having a general formula $LiMPO_4$ wherein M is one or more of cobalt, iron, manganese, and nickel. This provides an alternative solution to mitigate metal propagation at grain boundaries in a solid state electrolyte of an electrochemical cell.

In another aspect, the present disclosure provides an electrochemical device comprising a plurality of spaced apart cells, wherein each cell includes (i) a cathode, (ii) an anode comprising a metal, and (iii) a solid-state electrolyte positioned between the cathode and the anode, wherein the solid-state electrolyte comprises a single crystal of a solid electrolyte material. The solid electrolyte material may be selected from the group consisting of oxide materials with the garnet phase. The solid electrolyte material can be selected from the group consisting of oxide materials with the garnet phase. The solid electrolyte material can have the formula $Li_uRe_vM_wA_xO_y$, wherein:

Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;

u can vary from 3-7.5;

v can vary from 0-3;

w can vary from 0-2;

x can vary from 0-2; and y can vary from 11-12.5.

In one embodiment, the solid electrolyte material is a lithium lanthanum zirconium oxide having the formula $Li_{6.25}La_3Zr_2Al_{0.25}O_{12}$. The anode can comprise lithium metal. The anode can consist essentially of lithium, magnesium, sodium, or zinc. In one version of the electrochemical device, the solid-state electrolyte of each cell is not chemically or physically bound to the anode or cathode. In another version of the electrochemical device, the solid-state electrolyte of each cell is chemically bound to and physically supported by the cathode. In one version of the electrochemical device, the plurality of cells are bound to continuous current collectors and spacing of the plurality of cells is a discontinuity to reduce aspect ratio to mitigate physical stress on the solid-state electrolyte of each cell. In one version of the electrochemical device, the solid-state electrolyte of each cell has a thickness in a range of 1 nanometer to 1 millimeter. The cathode can comprise a lithium host material selected from the group consisting of lithium metal oxides wherein the metal is one or more of aluminum, cobalt, iron, manganese, nickel and vanadium, and lithium-containing phosphates having a general formula $LiMPO_4$ wherein M is one or more of cobalt, iron, manganese, and nickel. This provides a solution to mitigate metal propagation at grain boundaries in the solid state electrolyte of each cell of an electrochemical device.

In another aspect, the present disclosure provides an electrochemical cell comprising: a cathode; an anode comprising an electrochemically active metal such as lithium, magnesium, sodium, or zinc; a solid-state electrolyte positioned between the cathode and the anode; and a liquid electrolyte in contact with the cathode. The solid state electrolyte can have a structure comprising a plurality of grains of a metal-ion conductive material (e.g., LLZO) and a grain boundary phase (e.g., a metal oxide) located at some or all of grain boundaries between the grains. The metal-ion conductive material can comprise a ceramic material having a formula of $Li_wA_xM_2Re_{3-y}O_z$, wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0-0.75, wherein z is 10.875-13.125, and wherein the material has a garnet-type or garnet-like crystal structure.

In one embodiment, the metal-ion conductive material is a lithium lanthanum zirconium oxide having the formula $Li_{6.25}La_3Zr_2Al_{0.25}O_{12}$. The grain boundary phase can comprise a metal oxide selected from the group consisting of MgO, $Y_2O_3$, $La_2O_3$, $ZrO_2$, $Al_2O_3$, $Ga_2O_3$, $HfO_2$, $B_2O_3$, ZnO, $Er_2O_3$, and mixtures thereof. The anode can comprise lithium metal. The liquid electrolyte can comprise a lithium compound in an organic solvent. The lithium compound can be selected from $LiPF_6$, $LiBF_4$, $LiClO_4$, lithium bis(fluorosulfonyl)imide (LiFSI), $LiN(CF_3SO_2)_2$ (LiTFSI), and $LiCF_3SO_3$ (LiTf), and the organic solvent can be selected from carbonate based solvents, ether based solvents, ionic liquids, and mixtures thereof. The anode can comprise an electrochemically active metal selected from the group consisting of lithium, magnesium, sodium, and zinc. The cathode can comprise a lithium host material selected from the group consisting of lithium metal oxides wherein the metal is one or more of aluminum, cobalt, iron, manganese, nickel and vanadium, and lithium-containing phosphates having a general formula $LiMPO_4$ wherein M is one or more of cobalt, iron, manganese, and nickel.

In another aspect, the present disclosure provides an electrochemical cell comprising: a cathode; an anode comprising an electrochemically active metal such as lithium, magnesium, sodium, or zinc; a solid-state electrolyte positioned between the cathode and the anode; and a liquid electrolyte in contact with the cathode. The solid-state electrolyte can comprise a single crystal of a solid electrolyte material having the formula $Li_uRe_vM_wA_xO_y$, wherein:

Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;

u can vary from 3-7.5;

v can vary from 0-3;

w can vary from 0-2;

x can vary from 0-2; and y can vary from 11-12.5.

The solid-state electrolyte can comprise a single crystal of a solid electrolyte material such as a lithium lanthanum zirconium oxide having the formula $Li_{6.25}La_3Zr_2Al_{0.25}O_{12}$. The anode can comprise lithium metal. The liquid electrolyte can comprise a lithium compound in an organic solvent. The lithium compound can be selected from $LiPF_6$, $LiBF_4$, $LiClO_4$, lithium bis(fluorosulfonyl)imide (LiFSI), LiN$(CF_3SO_2)_2$ (LiTFSI), and $LiCF_3SO_3$ (LiTf), and the organic solvent can be selected from carbonate based solvents, ether based solvents, ionic liquids, and mixtures thereof. The anode can comprise an electrochemically active metal selected from the group consisting of lithium, magnesium, sodium, and zinc. The cathode can comprise a lithium host material selected from the group consisting of lithium metal oxides wherein the metal is one or more of aluminum, cobalt, iron, manganese, nickel and vanadium, and lithium-containing phosphates having a general formula $LiMPO_4$ wherein M is one or more of cobalt, iron, manganese, and nickel.

Solid-state batteries are positioned to be widely adopted as the energy storage method for electric vehicles due to their energy density, relatively low cost, and safety compared to the current state of the art. Solid-state batteries are rechargeable and generally remain safe and functional over a large range of temperatures (both high and low). The technology disclosed herein contributes to these advantages and overcomes observed shortcomings in these types of batteries. Beyond adoption in electric vehicles, solid-state batteries are being developed for a variety of energy storage applications including, but not limited to, consumer electronics and residential/commercial emergency back-up power systems.

BRIEF DESCRIPTION OF DRAWINGS

FIG. 3A is a cross-sectional view of a lithium electrochemical cell employing a solid electrolyte having grains comprising a metal-ion conductive material (e.g., LLZO) with unmodified grain boundaries.

FIG. 3B is a cross-sectional view of a lithium electrochemical cell employing a solid electrolyte having grains comprising a metal-ion conductive material (e.g., LLZO) with modified grain boundaries that prevent lithium metal propagation.

In FIG. 5, label 501 indicates $Mg_2AlO_4$ spinel is the second phase, label 502 indicates MgO coated LLZO pellet, and label 503 indicates MgO coated LLZO powder.

Figure 1:
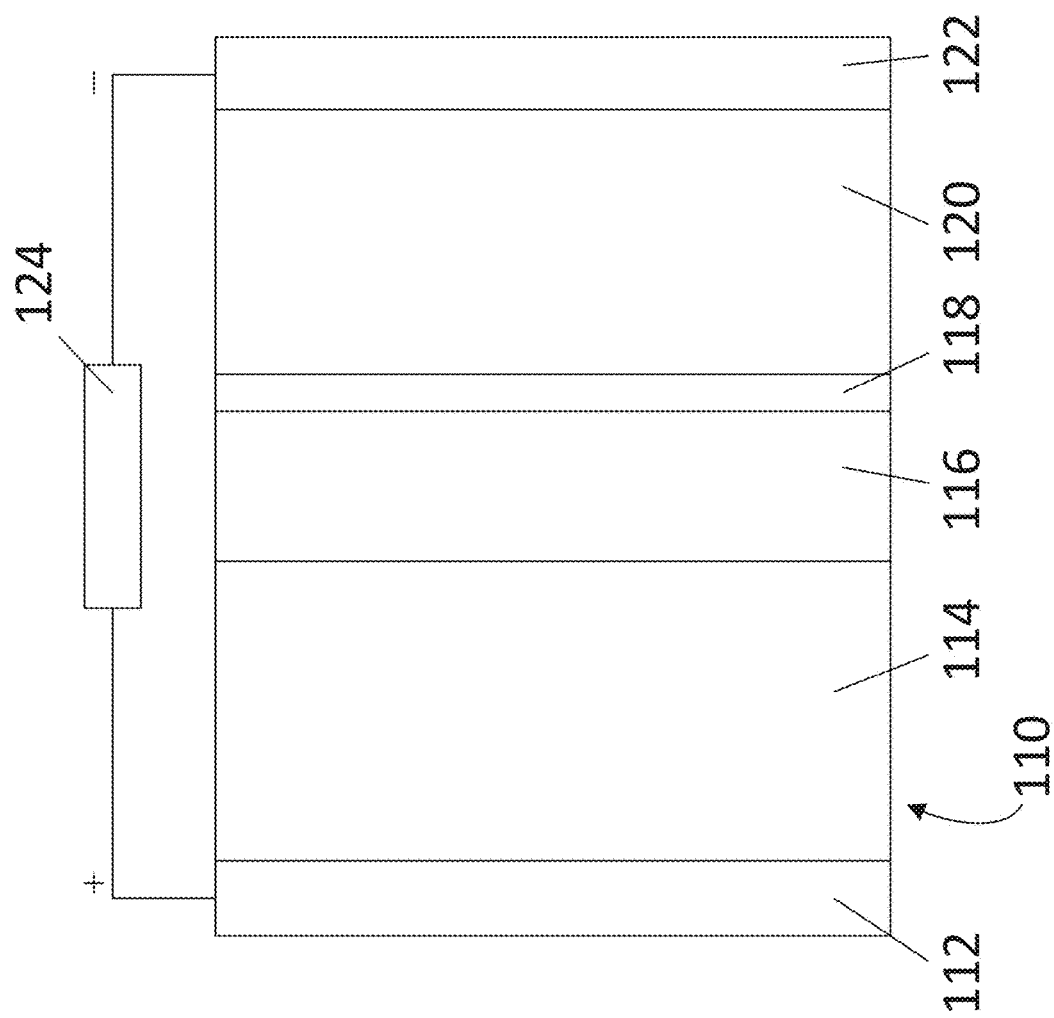
FIG. 1 is a schematic of a lithium metal battery.

The invention will be better understood and features, aspects and advantages other than those set forth above will become apparent when consideration is given to the following detailed description. Such detailed description makes reference to the drawings in which like reference numerals will be used to refer to like parts from Figure to Figure.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. Skilled artisans will recognize the examples provided herein have many useful alternatives and fall within the scope of embodiments of the invention.

In one non-limiting example application, a solid state electrolyte 116 of the present invention can be used in a lithium metal battery 110 as depicted in FIG. 1. The lithium metal battery 110 includes a current collector 112 (e.g., aluminum) in contact with a cathode 114. A solid state electrolyte 116 is arranged between the cathode 114 and an anode 118, which is in contact with a current collector 122 (e.g., aluminum). The current collectors 112 and 122 of the lithium metal battery 110 may be in electrical communication with an electrical component 124. The electrical component 124 could place the lithium metal battery 110 in electrical communication with an electrical load that discharges the battery or a charger that charges the battery.

The first current collector 112 and the second current collector 122 can comprise a conductive metal or any suitable conductive material. In some embodiments, the first current collector 112 and the second current collector 122 comprise aluminum, nickel, copper, combinations and alloys thereof. In other embodiments, the first current collector 112 and the second current collector 122 have a thickness of 0.1 microns or greater. The first current collector 112 and the second current collector 122 may each have a thickness between 0.1 micron and 400 microns, between 10 microns and 200 microns, or between 50 microns and 150 microns. It is to be appreciated that the thicknesses depicted in FIG. 1 are not drawn to scale, and that the thickness of the first current collector 112 and the second current collector 122 may be different.

A suitable active material for the cathode 114 of the lithium metal battery 110 is a lithium host material capable of storing and subsequently releasing lithium ions. An example cathode active material is a lithium metal oxide wherein the metal is one or more of aluminum, cobalt, iron, manganese, nickel and vanadium. Non-limiting example lithium metal oxides are $LiCoO_2$ (LCO), $LiFeO_2$, $LiMnO_2$ (LMO), $LiMn_2O_4$, $LiNiO_2$ (LNO), $LiNi_xCo_yO_2$, $LiMn_xCo_yO_2$, $LiMn_xNi_yO_2$, $LiMn_xNi_yO_4$, $LiNi_xCo_yAl_zO_2$, $LiNi_{1/3}Mn_{1/3}Co_{1/3}O_2$ and others. Another example of cathode active materials is a lithium-containing phosphate having a general formula $LiMPO_4$ wherein M is one or more of cobalt, iron, manganese, and nickel, such as lithium iron phosphate (LFP) and lithium iron fluorophosphates. Many different elements, e.g., Co, Mn, Ni, Cr, Al, or Li, may be substituted or additionally added into the structure to influence electronic conductivity, ordering of the layer, stability on delithiation and cycling performance of the cathode materials. The cathode active material can be a mixture of any number of these cathode active materials. The cathode may have a thickness between 0.1 micron and 400 microns, between 10 microns and 200 microns, or between 50 microns and 150 microns.

In some embodiments, a suitable active material for the anode 118 of the lithium metal battery 110 consists of lithium metal. In other embodiments, an example anode 118 material consists essentially of lithium metal. Alternatively, a suitable anode 118 consists essentially of magnesium, sodium, or zinc metal. The anode may have a thickness between 0.1 micron and 400 microns, between 10 microns and 200 microns, or between 50 microns and 150 microns.

Figure 2A:
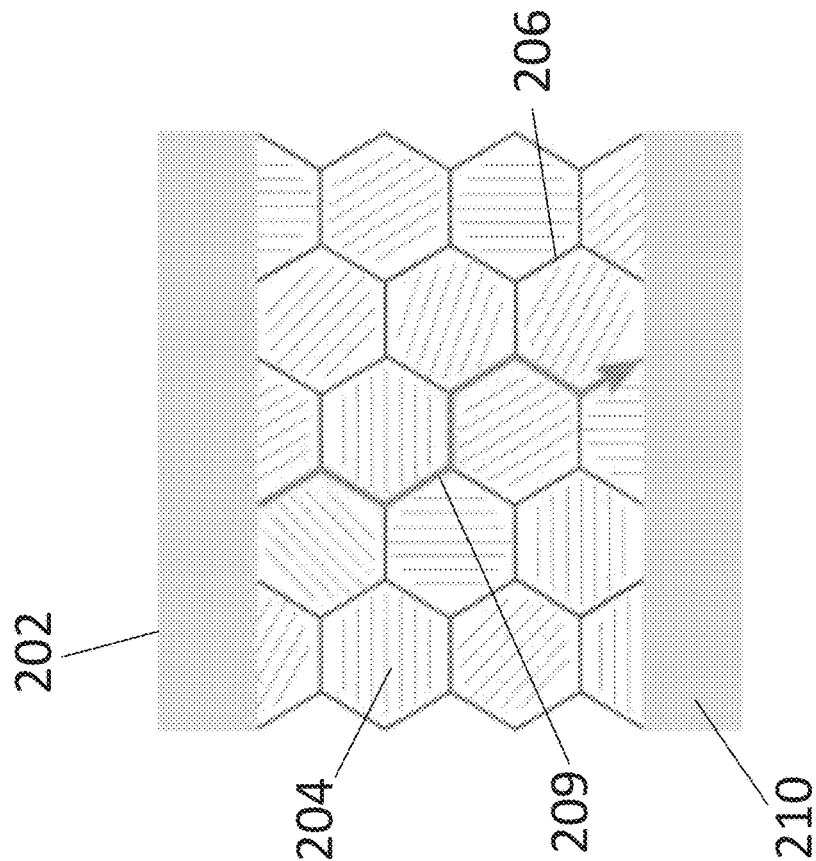
FIG. 2A is a cross-sectional view of an electrochemical cell showing lithium metal plating through a polycrystalline solid electrolyte (e.g., LLZO) in a transgranular manner.

The solid state electrolyte 116 may comprise a polycrystalline solid electrolyte having a plurality of grains of a metal-ion conductive material. For example, the metal-ion conductive material may conduct ions of lithium, magnesium, sodium, or zinc. We believe that the Monroe model [Ref. 6] is not applicable to polycrystalline solid electrolytes. Polycrystalline materials comprise grains and grain boundaries. Yet, the role that grain boundaries play in governing metal (e.g., lithium) filament initiation and propagation may be unclear. Nevertheless, we determined that of the two possible propagation mechanisms in polycrystalline materials comprising grains 204 and grain boundaries 206 (see FIGS. 2A and 2B), lithium from lithium electrodes 202, 210 preferentially propagates intergranularly 209 (FIG. 2B) rather than transgranularly 208 (see FIG. 2A). Understanding the mode of propagation guided our efforts to better engineer the microstructure and/or interfaces to increase the current density at which lithium is plated during charging solid-state batteries employing metallic lithium electrodes.

Figure 2B:
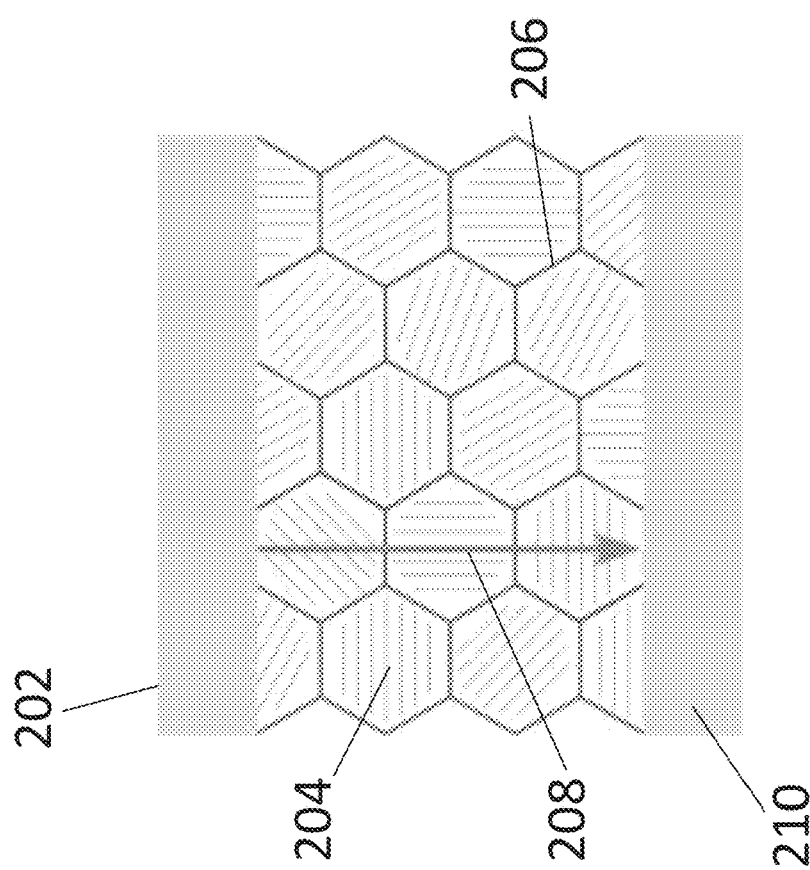
FIG. 2B is a cross-sectional view of an electrochemical cell showing lithium metal plating through a polycrystalline solid electrolyte (e.g., LLZO) in an intergranular manner.
Figure 3C:
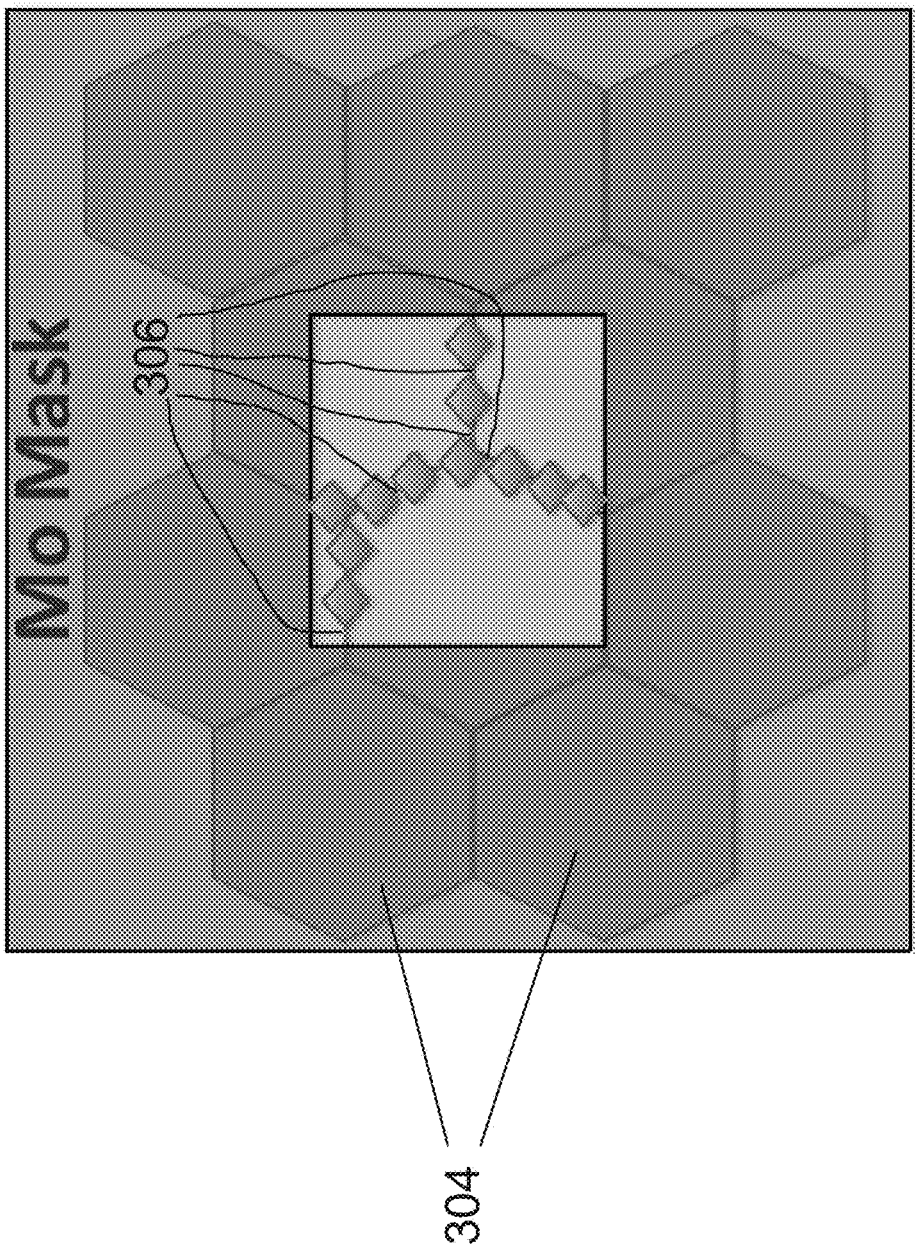
FIG. 3C is a schematic showing lithium metal piling up at unmodified grain boundaries in a lithium electrochemical cell employing a solid electrolyte having grains comprising a metal-ion conductive material (e.g., LLZO) with unmodified grain boundaries.

After clearly identifying the point source of failure as the lithium metal-grain boundary-grain junction as explained with reference to FIG. 2B, we developed an approach to suppress lithium metal penetration in a polycrystalline solid electrolyte. Looking at FIG. 3A, during operation of the electrochemical cell 300, lithium metal 303 from lithium metal anode 302 moves toward cathode 310 (which may comprise the cathode materials listed above) and starts to propagate at junctions (triple point interface) between $Li_7La_3Zr_2O_{12}$ (LLZO) grains 304 and grain boundaries 306 of the polycrystalline solid electrolyte 305. This invention modifies the polycrystalline solid electrolyte 305 of an electrochemical cell 300A to include a grain boundary phase 307 located at some or all of grain boundaries between the grains 304 (see FIG. 3B). The grain boundary phase 307 prevents lithium metal propagation at junctions between $Li_7La_3Zr_2O_{12}$ (LLZO) grains 304 and grain boundaries 306. The modified grain boundaries preferably exhibit the following properties: (1) they prevent electronic conduction; (2) they may or may not be ionically conducting; (3) they are not soluble in the grains, such that any chemical modification of the grain boundary remains at the grain boundary during high temperature processing; (4) they are electrochemically stable at the $Li^+/Li^0$ redox potential; and (5) they increase the surface energy of the Li metal-grain boundary-grain junction to suppress lithium metal propagation.

The polycrystalline solid electrolyte 305 may have a thickness of 0.1-2000 microns, or 1-1000 microns, or 5-100 microns, or 5-50 microns, or 5-25 microns. Though the grain boundary chemical modification may increase the grain boundary resistance, in practice, polycrystalline solid electrolyte membranes may only be one or a few grains thick (~10 μm total thickness). Thus, there may be no grain boundary (if only one grain thick) or a few grains thick in membranes. Though these chemical modifications may increase the solid electrolyte membrane resistance, they can be engineered (using atomic layer deposition, physical vapor deposition, or sol-gel chemistry) to produce relatively thin (~nm) grain boundaries. By virtue of the low dimensionality, the overall contribution of the modified grain boundaries to the resistance may be reduced to a relatively low value.

An example metal-ion conductive material comprising the grains 304 of the polycrystalline solid electrolyte 305 is a metal-ion conductive ceramic material having the formula $Li_uRe_vM_wA_xO_y$, wherein Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;

u can vary from 3-7.5;
v can vary from 0-3;
w can vary from 0-2;
x is 0-2; and
y can vary from 11-12.5.

$Li_7La_3Zr_2O_{12}$ (LLZO) materials are beneficial for use as the metal-ion conductive ceramic material. LLZO materials have been reported as having an electronic conductivity of $2\times10^{-8}$ S/cm. See, Ezhiyl Rangasamy, Jeff Wolfenstine, Jeffrey Sakamoto, "The role of Al and Li concentration on the formation of cubic garnet solid electrolyte of nominal composition $Li_7La_3Zr_2O_{12}$", Solid State Ionics 206 (2012) 28. The grains 304 of the polycrystalline solid electrolyte 305 may have a grain size of 0.1-2000 microns, or 1-1000 microns, or 5-100 microns, or 5-50 microns, or 5-25 microns.

Another example metal-ion conductive material can include any combination oxide or phosphate materials with a garnet, perovskite, NaSICON, or LiSICON phase. The metal-ion conductive material can include any solid-like material capable of storing and transporting ions between the anode and cathode, so long as the solid-like material has negligible electronic conductivity and is electrochemically stable against high voltage cathodes and metal (e.g., lithium) anodes.

The grain boundary phase 307 can comprise an electrically insulating material. The grain boundary phase 307 can comprise an ionically conductive material or an ionically resistive material. The grain boundary phase 307 can be electrochemically stable at a $Li^+/Li^0$ redox potential or less. The grain boundary phase 307 can increase a surface energy of the grain boundaries between the grains. In one embodiment, the grain boundary phase 307 comprises a metal oxide. The metal oxide can be selected from the group consisting of MgO, $Y_2O_3$, $La_2O_3$, $ZrO_2$, $Al_2O_3$, $Ga_2O_3$, $HfO_2$, $B_2O_3$, ZnO, $Er_2O_3$, and mixtures thereof. These binary oxides can be selected for their stability at low potentials and are typically electronically insulating.

Figure 4A:
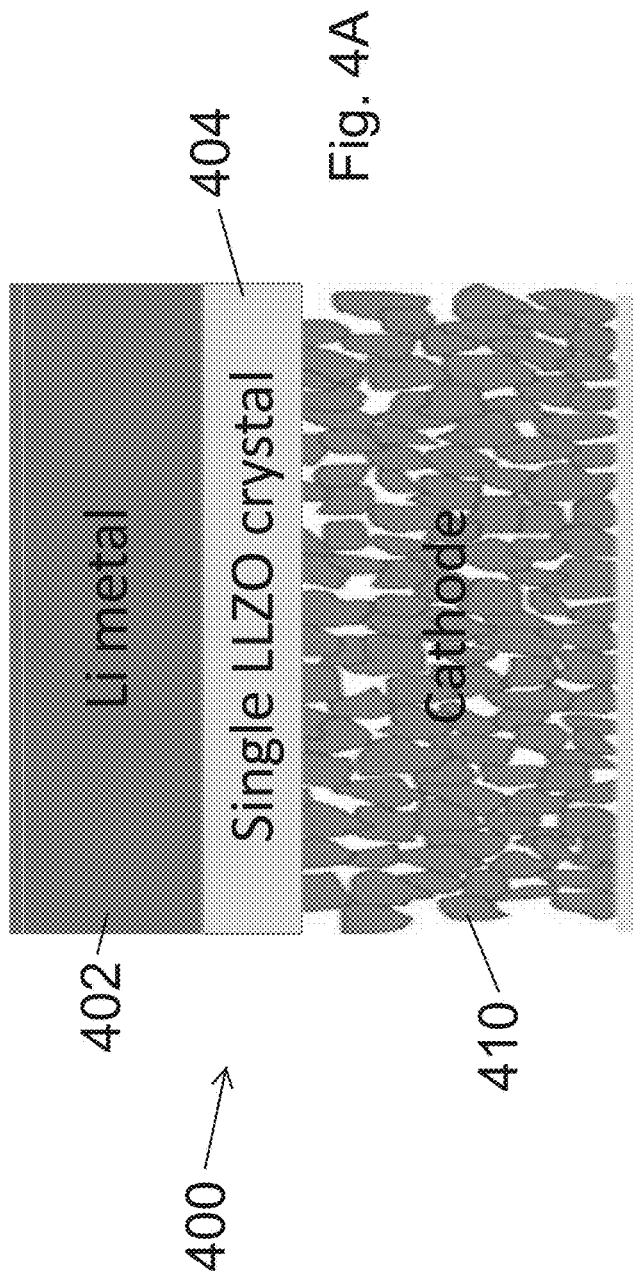
FIG. 4A is a cross-sectional view of a lithium electrochemical unit cell employing a single-crystal solid LLZO electrolyte membrane.
Figure 4B:
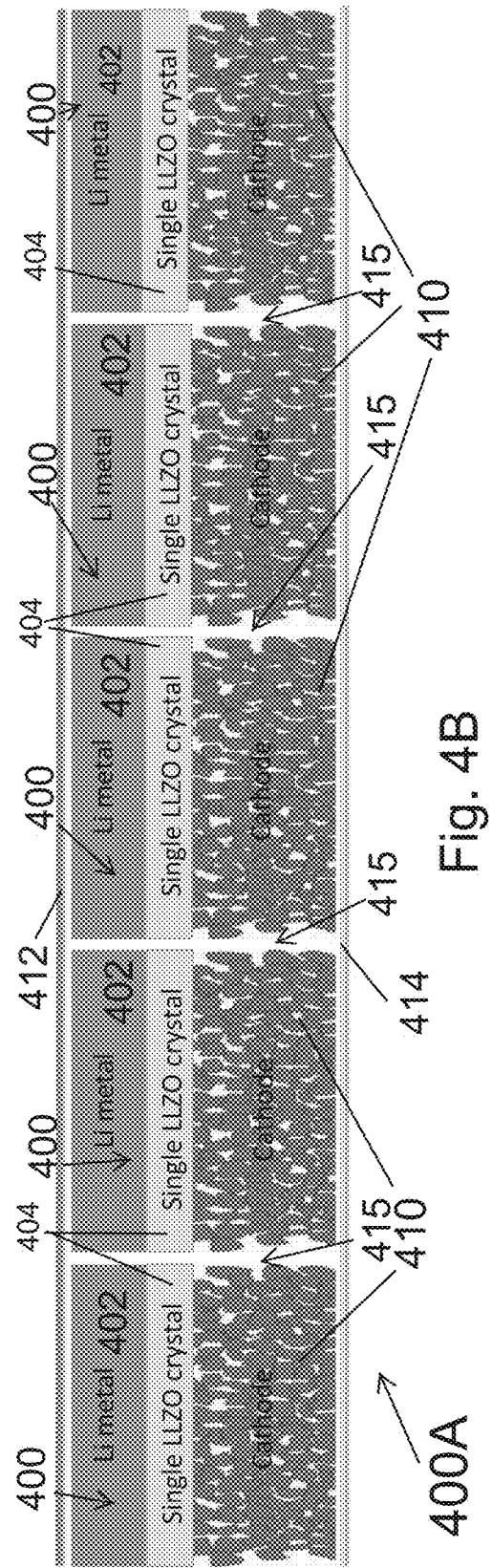
FIG. 4B is a cross-sectional view of a lithium electrochemical device employing a plurality of unit cells including a single-crystal solid LLZO electrolyte membrane bound to a continuous metal foil current collector, but physically separated by gaps or stress-reliefs between unit cells.

Turning to FIG. 4A, an alternative solution to mitigate Li metal propagation at grain boundaries is an electrochemical cell 400 comprising a cathode 410 (which may comprise the cathode materials listed above), a lithium metal anode 402, and a solid electrolyte 404 that comprises a single LLZO crystal, i.e., eliminate LLZO grain boundaries altogether. Because single-crystal ceramics are brittle and weak, the LLZO crystal aspect ratios must be relatively small. FIG. 4B shows an example embodiment of a battery 400A with a multiple cell configuration that uses a single-crystal LLZO solid electrolyte 404 in each cell 400. By dividing the cells 400 into individual units through the introduction of gaps 415 or stress-reliefs, the LLZO membrane aspect ratio can be reduced, i.e. instead of large-area (>1 m²) and thin sheets, the area is dramatically reduced (<1 m²) while maintaining relatively thin (e.g., 1 nm to 1 mm thick). In addition, the single-LLZO crystals 404 are chemically and/or rigidly bound to the cathode 410 such that the cathode 410 provides the physical support for the LLZO single-crystal 404. The battery 400A includes current collectors 412, 414 that may be the current collector materials listed above. In another embodiment, the LLZO does not have to be bound to the cathode 410 or anode 402. In another embodiment, the LLZO can be bound to the cathode 410 directly or using an interlayer comprising an inorganic, organic polymer material, or through a mechanical "lock and key" bond.

EXAMPLES

The following Examples are provided in order to demonstrate and further illustrate certain embodiments and aspects of the present invention and are not to be construed as limiting the scope of the invention.

Example 1

Figure 5:
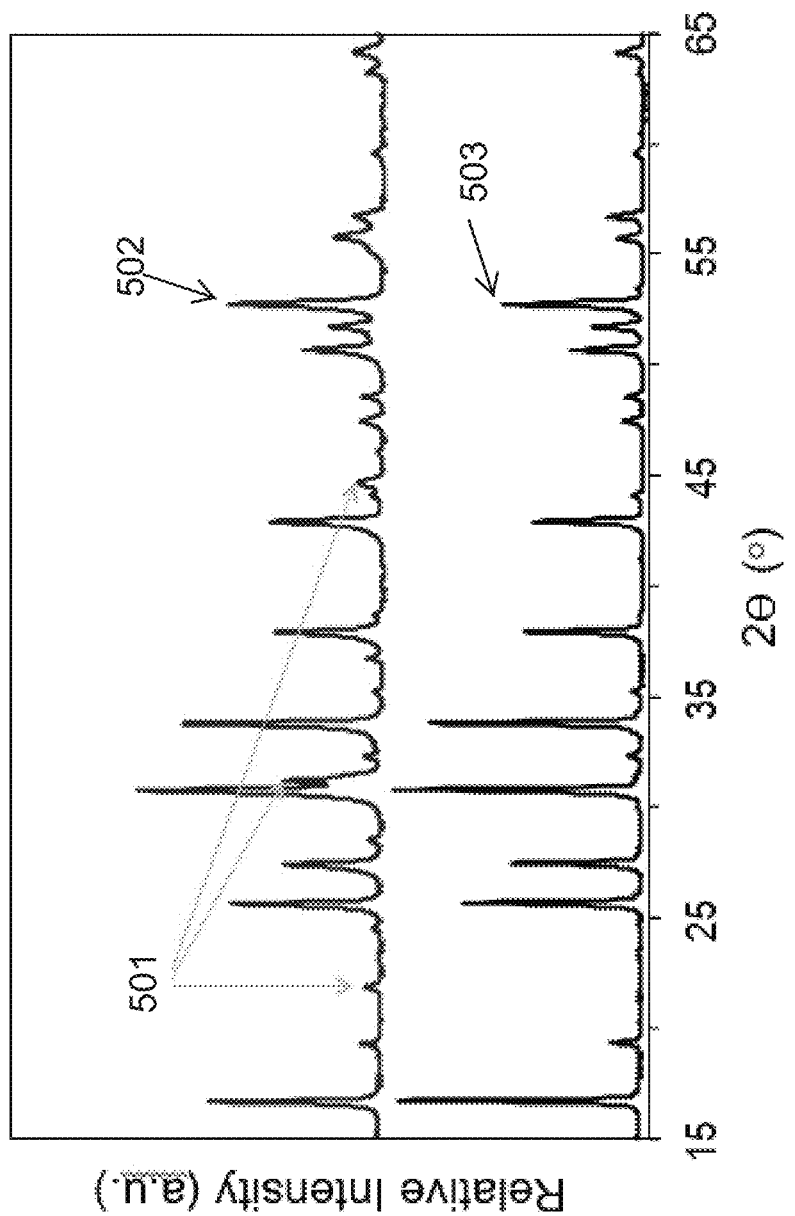
FIG. 5 shows X-Ray diffraction data of LLZO coated with MgO using sol-gel chemistry: (i) after sol-gel coating and before heating (bottom), and (ii) after hot pressing MgO-coated LLZO powder into a pellet (top).
Figure 6:
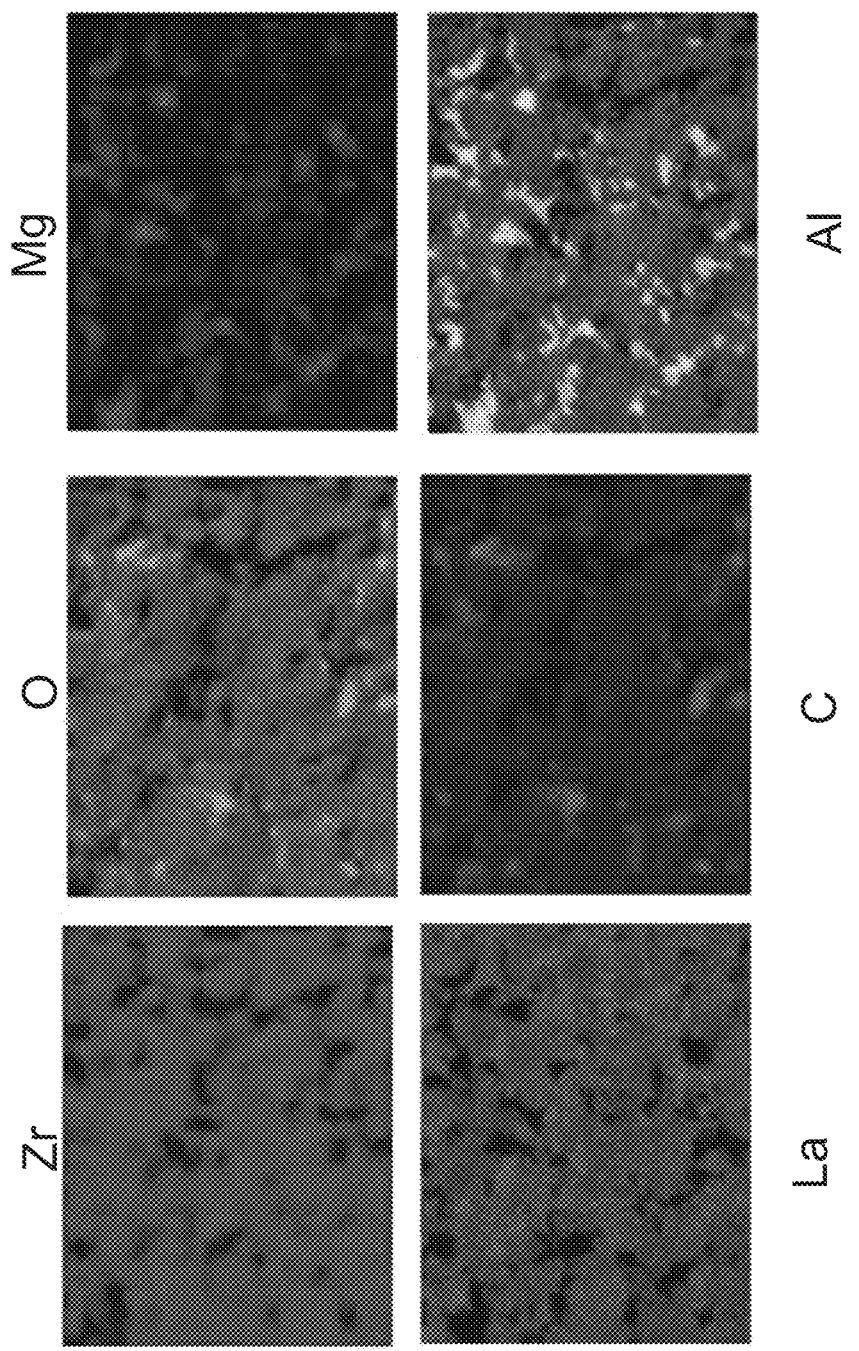
FIG. 6 shows backscattered electron scanning electron microscopy element mapping of MgO sol-gel coated LLZO after hot pressing and polishing. The secondary phase is rich in Mg, Al, O, and C, while the matrix exhibits a uniform distribution of La and Zr.
Figure 7:
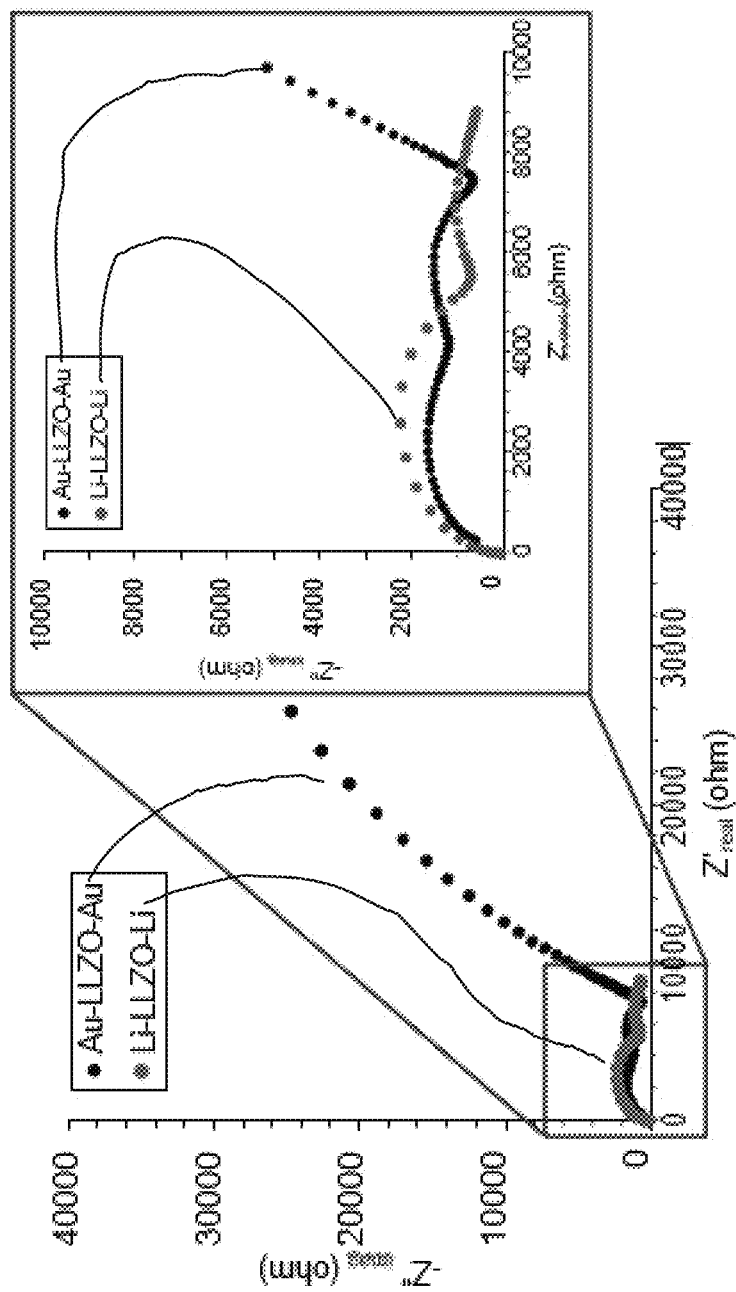
FIG. 7 shows electrochemical impedance spectroscopy (EIS) of Au-LLZO+MgO—Au and Li-LLZO+MgO—Li cells.

To demonstrate that LLZAO (0.25 moles Al added to LLZO to stabilize the cubic phase) grain boundaries can be modified using one of the oxides mentioned above, MgO was incorporated into an LLZAO microstructure. A sol-gel approach was used to coat LLZAO particles, followed by hot pressing at 1100° C. for 1 hour. The densified pellet was characterized using X-Ray diffraction-XRD (see FIG. 5), scanning electron microscopy (SEM) (see FIG. 6), and electrochemical impedance spectroscopy (EIS) (see FIG. 7).

The XRD data show that the LLZAO contained $MgAl_2O_4$ after hot pressing. It is likely that the MgO reacted with some of the Al from the LLZO, to form some $MgAl_2O_4$, which remained a secondary phase within the LLZAO microstructure. The SEM (FIG. 6) analysis, confirms that regions rich in Mg, Al, and O, were likely $MgAl_2O_4$, which agrees with the XRD data. $MgAl_2O_4$ also contained significant quantities of C. The EIS data confirms that despite the presence of $MgAl_2O_4$ in the microstructure, the LLZAO is still an ionic conductor. Moreover, the LLZAO+MgO exhibited a total resistance significantly higher than typical LLZAO with no MgO present. This could suggest that the $MgAl_2O_4$ or MgO was present at grain boundaries, thus increasing resistance. These data confirm that MgO forms stable phases within LLZAO that can be distributed more uniformly at grain boundaries.

Example 2

Figure 8B:
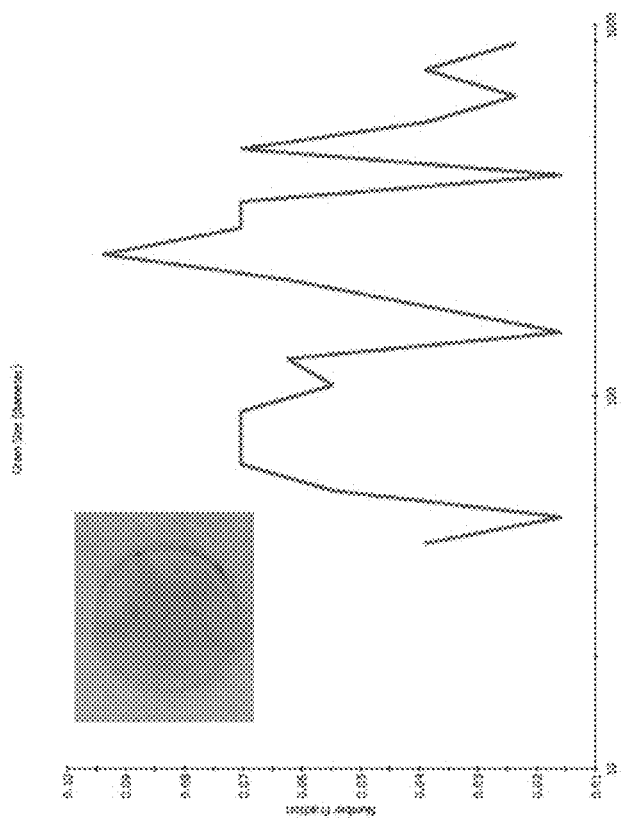
FIG. 8B is an electron backscatter selected area diffraction (EBSD) image of large grain LLZO—each color represents a unique crystallographic orientation, e.g. grain.
Figure 8A:
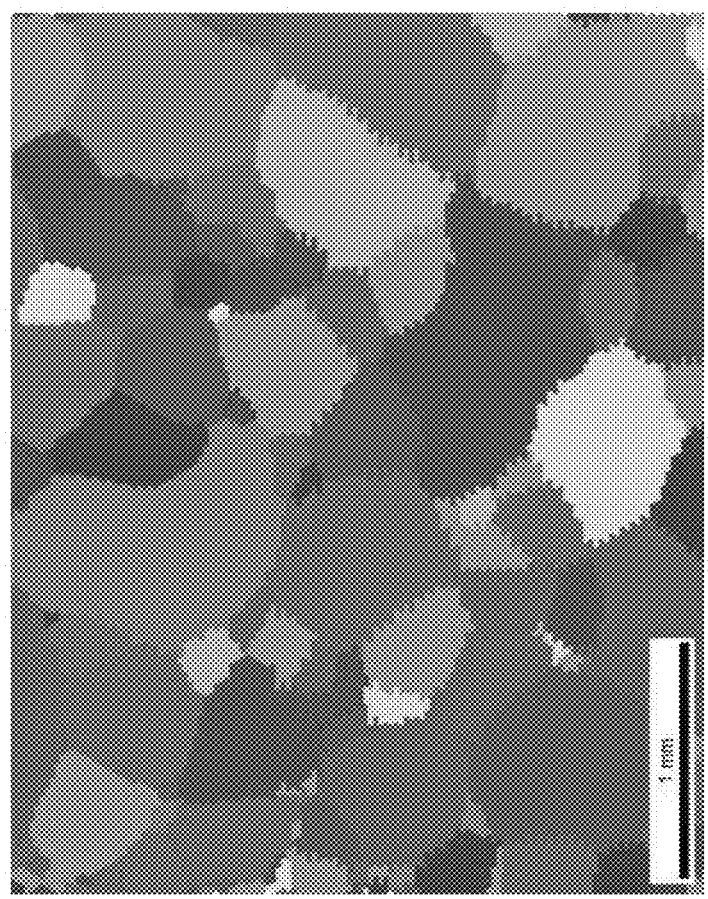
FIG. 8A is a grain size histogram confirming relatively large LLZO grains can be made.

To demonstrate the single crystal LLZO cell approach, a process for controlling the grain size from between 1 μm and >1500 μm was developed. The process involved densifying LLZO between 1100° C. and 1400° C. to grow the grains. Electron backscatter selected area diffraction (EBSD) was used to identify grains (by their crystallographic orientation) to determine the grain size and grain size distribution (see FIG. 8A). Along with larger grains, the LLZO also becomes optically transparent, thus indicating negligible porosity. This processing approach can be used to enable the cell configuration in FIG. 4A. Looking at FIGS. 8A and 8B, fabrication of large LLZO grains is shown. In FIG. 8A, a grain size histogram confirmed relatively large LLZO grains can be made. In FIG. 8B, an EBSD image of large grain LLZO is shown wherein each color represents a unique crystallographic orientation, e.g., grain.

Example 3

Figures 9A, 9B:
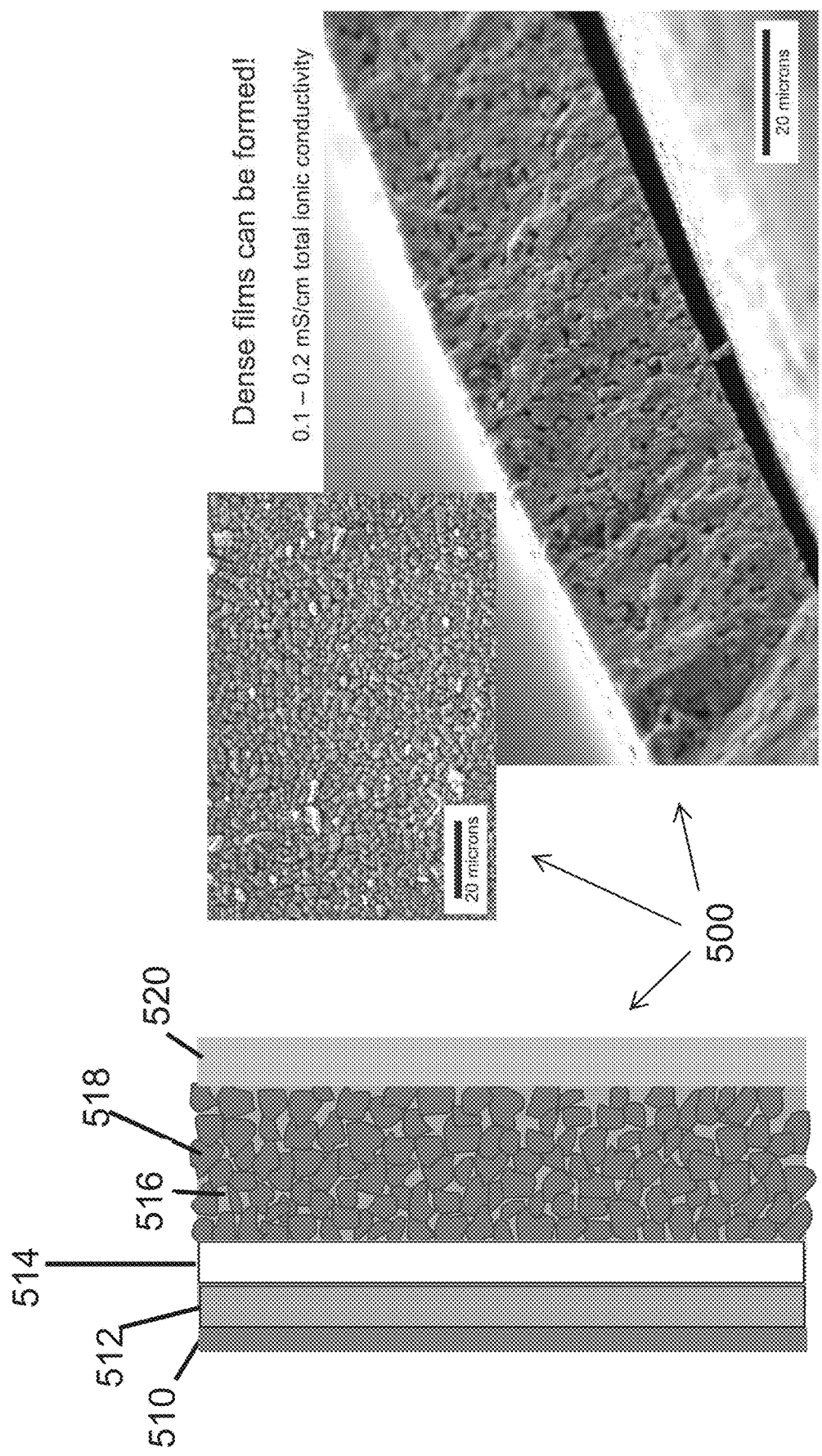
FIG. 9A is a cross-sectional view of a lithium metal electrochemical cell employing a solid electrolyte having grains comprising a metal-ion conductive material (e.g., LLZO) with modified grain boundaries that prevent lithium metal propagation.
FIG. 9B shows side view and perspective view photographs of the lithium metal electrochemical cell of FIG. 9A.

To demonstrate that dense films can be formed, an example electrochemical cell structure was prepared. As shown in FIG. 9A, the cell structure 500 comprised a nickel foil current collector 510, a lithium metal anode 512, a 10 μm thick solid electrolyte 514 having grains comprising LLZO with MgO modified grain boundaries that prevent lithium metal propagation, a cathode active material 518 comprising $LiMO_2$ particles (where M is a metal—e.g., $LiCoO_2$) in a liquid electrolyte 516, and an aluminum current collector 520. From FIG. 9B, it can be seen that dense films can be formed. The film of FIG. 9B had a total ionic conductivity of 0.1-0.2 mS/cm.

In the electrochemical cell of FIG. 9A, an example liquid electrolyte 516 comprises a lithium compound in an organic solvent. The lithium compound may be selected from $LiPF_6$, LiBF$_4$, LiClO$_4$, lithium bis(fluorosulfonyl)imide (LiFSI), LiN(CF$_3$SO$_2$)$_2$ (LiTFSI), and LiCF$_3$SO$_3$ (LiTf). The organic solvent may be selected from carbonate based solvents, ether based solvents, ionic liquids, and mixtures thereof. The carbonate based solvent may be selected from the group consisting of dimethyl carbonate, diethyl carbonate, ethyl methyl carbonate, dipropyl carbonate, methylpropyl carbonate, ethylpropyl carbonate, methylethyl carbonate, ethylene carbonate, propylene carbonate, and butylene carbonate; and the ether based solvent may be selected from the group consisting of diethyl ether, dibutyl ether, monoglyme, diglyme, tetraglyme, 2-methyltetrahydrofuran, tetrahydrofuran, 1,3-dioxolane, 1,2-dimethoxyethane, and 1,4-dioxane.

In the electrochemical cell 500 of FIG. 9A, an alternative solid-state electrolyte comprises a single crystal of a solid electrolyte material, such as a lithium lanthanum zirconium oxide, preferably having the formula Li$_{6.25}$La$_3$Zr$_2$Al$_{0.25}$O$_{12}$.

In the electrochemical cell of FIG. 9A, an alternative to the liquid electrolyte is a gelled or solid-state electrolyte.

Example 4

Figure 10:
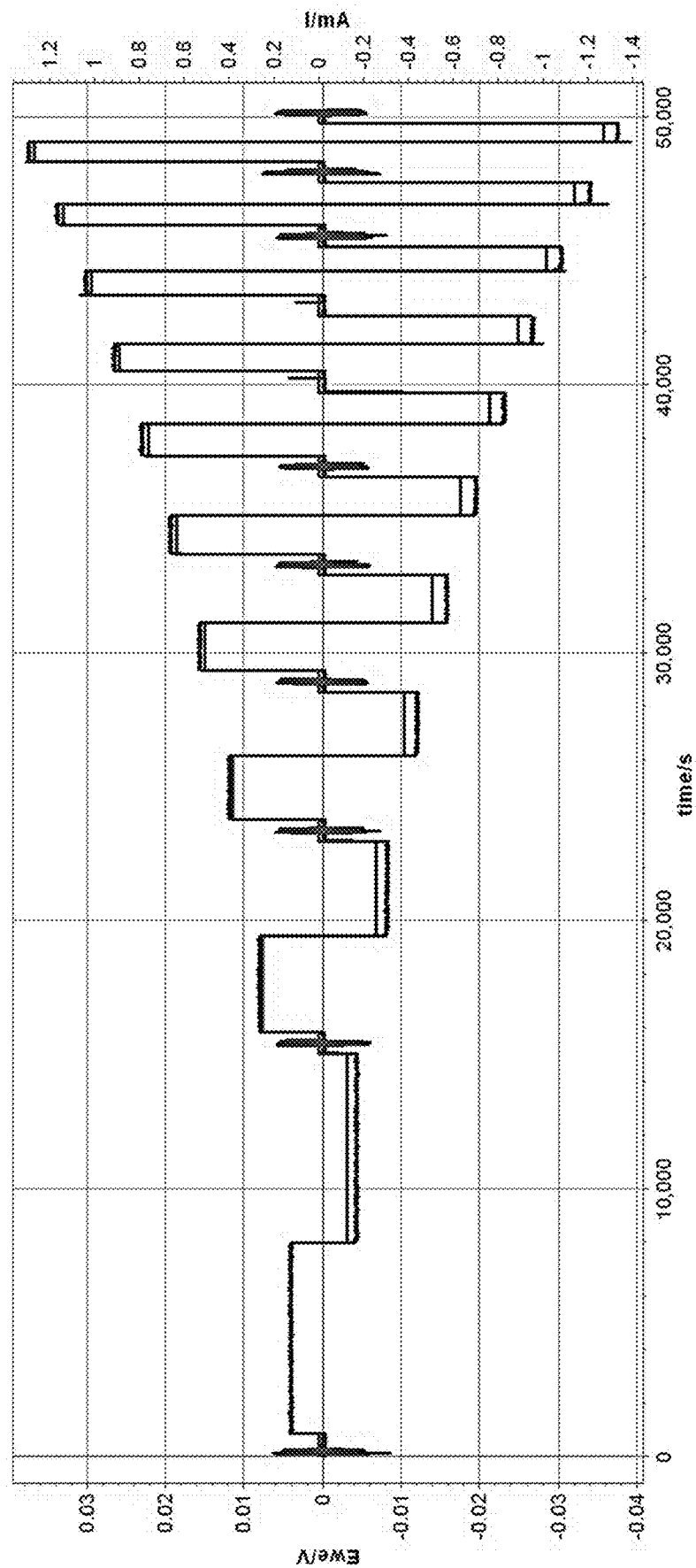
FIG. 10 shows a graph of stepped galvanostatic cycling of MgO modified LLZTO ($Li_{6.5}La_3Zr_{1.5}Ta_{0.5}O_{12}$) from 0.1 to 1.0 mAh/cm$^2$ at 60° C.

To demonstrate modification of LLZTO (Li$_{6.5}$La$_3$Zr$_{1.5}$Ta$_{0.5}$O$_{12}$), loose LLZTO powders were coated by atomic layer deposition (ALD) with 20 cycles of MgO. The coated powders were rapid induction hot pressed at 1150° C. for 30 minutes. The densified billet was cut into disks and polished. Lithium was applied to both sides of the pellet and the cell was cycled galvanostatically at 60° C. from a current density of 0.10 mA/cm$^2$ to 1.0 mA/cm$^2$, increasing by 0.1 mA/cm$^2$ per cycle and reversing direction after 0.250 mAh/cm$^2$ of lithium was plated (see FIG. 10). The flat voltage profiles indicate the Li/LLZO interface is stable and no degradation occurs at the interface or along grain boundaries at current densities up to 1.0 mAh/cm$^2$.

Figure 11:
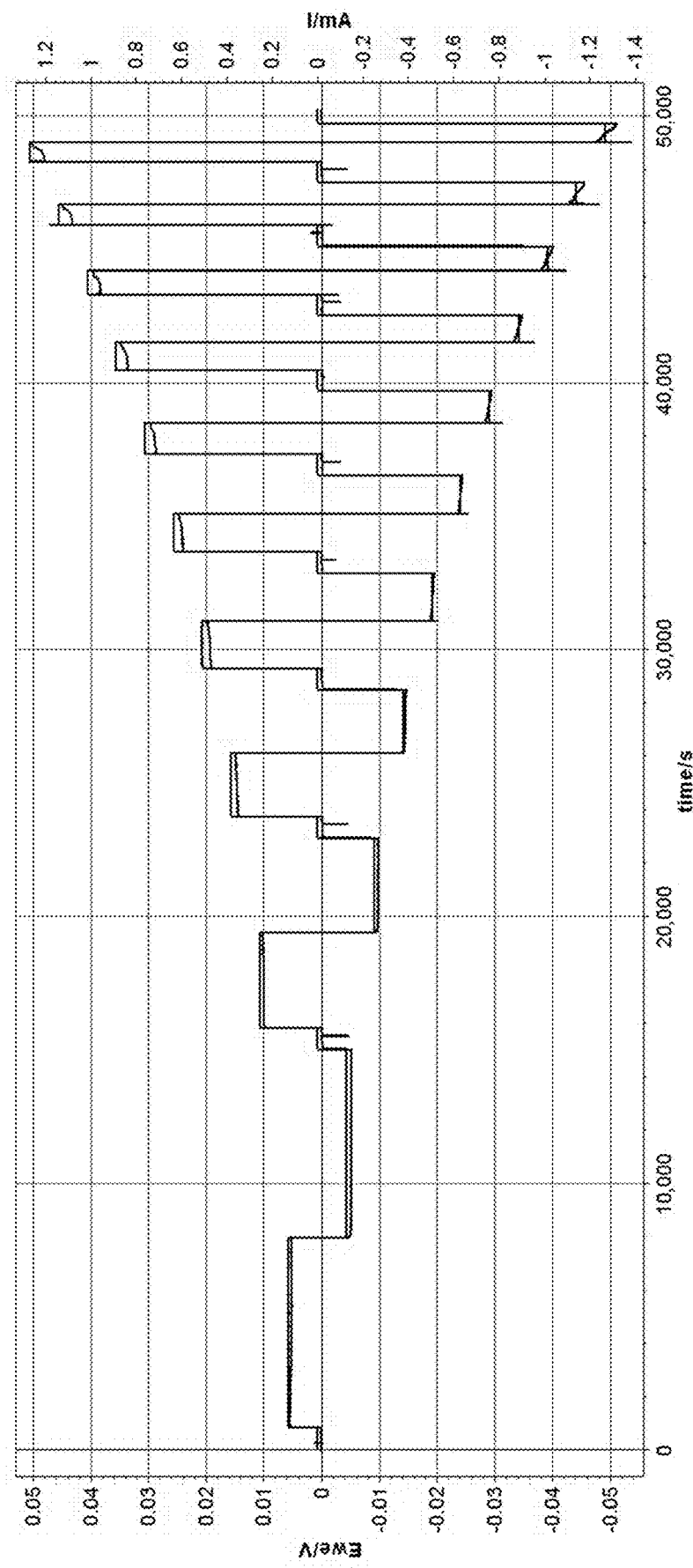
FIG. 11 shows a graph of stepped galvanostatic cycling of unmodified LLZTO ($Li_{6.5}La_3Zr_{1.5}Ta_{0.5}O_{12}$) from 0.1 to 1.0 mAh/cm$^2$ at 60° C.

A second set of samples repeated the LLZTO hot pressing and processing steps but without ALD deposition of MgO on the powders before processing. Li/LLZTO/Li cells were then produced. Stepped galvanostatic testing under the same conditions produced voltage profiles as shown in FIG. 11. These voltage profiles show significant polarization as each galvanostatic step cycles, indicating increasing resistance from the Li/LLZTO/Li cells due to degradation at the Li/LLZTO interface or grain boundaries.

REFERENCES

1. EV Everywhere Grand Challenge, Available from: http://energy.gov/eere/vehicles/ev-everywhere-grand-challenge-does-10-year-vision-plug-electric-vehicles.
2. Sakamoto J., Super-ionic Conducting Oxide Electrolytes. *Handbook of Solid State Batteries*. 2015; 6:391.
3. Stramare S, Thangadurai V, Weppner W., Lithium lanthanum titanates: a review. *Chemistry of materials*. 2003; 15(21):3974-90.
4. Bohnke O, Bohnke C, Fourquet J., Mechanism of ionic conduction and electrochemical intercalation of lithium into the perovskite lanthanum lithium titanate. *Solid State Ionics*. 1996; 91(1-2):21-31.
5. Ni J E, Case E D, Sakamoto J S, Rangasamy E, Wolfenstine J B., Room temperature elastic moduli and Vickers hardness of hot-pressed LLZO cubic garnet. *Journal of Materials Science*. 2012; 47(23):7978-85.
6. Monroe C, Newman J., The impact of elastic deformation on deposition kinetics at lithium/polymer interfaces. *Journal of The Electrochemical Society*. 2005; 152(2):A396-A404.
7. Sharafi A, Meyer H M, Nanda J, Wolfenstine J, Sakamoto J., Characterizing the Li—Li$_7$La$_3$Zr$_2$O$_{12}$ interface stability and kinetics as a function of temperature and current density. *Journal of Power Sources*. 2016; 302:135-9.
8. Ren Y, Shen Y, Lin Y, Nan C-W., Direct observation of lithium dendrites inside garnet type lithium-ion solid electrolyte. *Electrochemistry Communications*. 2015; 57:27-30.
9. Ishiguro K, Nakata Y, Matsui M, Uechi I, Takeda Y, Yamamoto O, et al., Stability of Nb-Doped Cubic Li$_7$La$_3$Zr$_2$O$_{12}$ with Lithium Metal. *Journal of The Electrochemical Society*. 2013; 160(10):A1690-A3.
10. Kim Y, Yoo A, Schmidt R, Sharafi A, Lee H, Wolfenstine J, et al., Electrochemical Stability of Li$_{6.5}$La$_3$Zr$_{1.5}$M$_{0.5}$O$_{12}$ (M=Nb or Ta) against Metallic Lithium. *Frontiers in Energy Research*. 2016; 4:20.
11. Cheng E J, Sharafi A, Sakamoto J., Intergranular Li metal propagation through polycrystalline Li$_{6.25}$Al$_{0.25}$La$_3$Zr$_2$O$_{12}$ ceramic electrolyte. *Electrochimica Acta*. 2017; 223:85-91.

The citation of any document is not to be construed as an admission that it is prior art with respect to the present invention.

Thus, the present invention provides a method of suppressing and potentially eliminating metallic propagation through a polycrystalline solid electrolyte in solid-state batteries. A previously proposed theory stated that metallic filament initiation at the lithium/electrolyte interface was governed by the lithium/electrolyte shear modulus, such that if the solid electrolyte shear modulus was a factor of two higher than that of lithium, lithium filament initiation could be prevented. This has been shown to not be applicable to polycrystalline solid electrolytes. Metallic lithium propagation through a polycrystalline solid electrolyte with a relatively high shear modulus has been observed. The methods of the present disclosure provide a solution to this recently observed issue, enhancing stability of the lithium/electrolyte interface, which will mitigate degradation and improve charging rates of solid-state batteries.

The present invention also provides another materials technology to suppress or eliminate lithium metal propagation in a solid electrolyte. An embodiment of an electrochemical cell of the invention comprises: a cathode; an anode comprising an electrochemically active metal such as lithium, magnesium, sodium, or zinc; and a solid-state electrolyte positioned between the cathode and the anode, wherein the solid-state electrolyte comprises a single crystal of a solid electrolyte material. This provides an alternative solution to mitigate metal propagation at grain boundaries in a solid state electrolyte of an electrochemical cell.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for suppressing propagation of a metal in a solid state electrolyte during cycling of an electrochemical device including the solid state electrolyte and an electrode comprising the metal, the method comprising:
   forming the solid state electrolyte such that the solid state electrolyte has a structure comprising a plurality of grains of a metal-ion conductive material and a grain boundary phase located at some or all of grain boundaries between the grains, wherein the grain boundary phase suppresses propagation of the metal in the solid state electrolyte during cycling, and wherein forming the solid state electrolyte comprises coating a powdered metal-ion conductive material using a technique selected from the group consisting of atomic layer deposition, physical vapor deposition, chemical vapor deposition, sol-gel chemistry, and solid-state reaction to create a metal oxide coated powdered metal-ion conductive material, and sintering the metal oxide coated powdered metal-ion conductive material to form the solid state electrolyte, and removing surface material from the solid state electrolyte, and thereafter applying the electrode to the solid state electrolyte to form an interface between the electrode and the solid state electrolyte.

2. The method of claim 1, wherein the grain boundary phase comprises an electrically insulating material.

3. The method of claim 1, wherein the metal is lithium.

4. The method of claim 1, wherein the grain boundary phase comprises an ionically conductive material.

5. The method of claim 1, wherein the grain boundary phase comprises an ionically resistive material.

6. The method of claim 1, wherein the grain boundary phase is electrochemically stable at a $Li^+/Li^0$ redox potential or less.

7. The method of claim 1, wherein the grain boundary phase increases a surface energy of the grain boundaries between the grains.

8. The method of claim 1, wherein the grain boundary phase comprises a metal oxide.

9. The method of claim 1, wherein the grain boundary phase comprises a metal oxide selected from the group consisting of MgO, $Y_2O_3$, $La_2O_3$, $ZrO_2$, $Al_2O_3$, $Ga_2O_3$, $HfO_2$, $B_2O_3$, ZnO, $Er_2O_3$, and mixtures thereof.

10. The method of claim 1, wherein the structure has a thickness of five grains or less.

11. The method of claim 1, wherein the electrode comprises an anode.

12. The method of claim 11, wherein the metal consists essentially of lithium, magnesium, sodium, or zinc.

13. The method of claim 1, wherein metal-ion conductive material comprises a material having any combination oxide or phosphate materials with a garnet, perovskite, NaSICON, or LiSICON phase.

14. The method of claim 1, wherein removing surface material from the solid state electrolyte comprises polishing.

15. The method of claim 1, wherein no degradation occurs at the interface or along the grain boundaries during cycling of the electrochemical device at current densities up to 1.0 $mAh/cm^2$.

16. The method of claim 1, wherein forming the solid state electrolyte comprises coating the powdered metal-ion conductive material using atomic layer deposition.

17. The method of claim 1, wherein the grain boundary phase comprises MgO.

18. The method of claim 1, wherein the electrode comprises an anode, and the method further comprises applying a cathode to the solid state electrolyte.

19. The method of claim 18, wherein the cathode comprises a lithium host material selected from the group consisting of lithium metal oxides wherein the metal is one or more of aluminum, cobalt, iron, manganese, nickel and vanadium, and lithium-containing phosphates having a general formula $LIMPO_4$ wherein M is one or more of cobalt, iron, manganese, and nickel.

20. The method of claim 1, wherein the sintering occurs at a temperature between 500° C. and 1500° C. at atmospheric pressure.

21. The method of claim 1, wherein the grain boundary phase is not soluble in the grains of the metal-ion conductive material.

22. The method of claim 1, wherein forming the solid state electrolyte comprises coating the powdered metal-ion conductive material using sol-gel chemistry.

23. The method of claim 1, wherein the metal-ion conductive material comprises a ceramic material having a formula of $Li_wA_xM_2Re_{3-y}O_z$, wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0-0.75, wherein z is 10.875-13.125, and wherein the material has a garnet-type or garnet-like crystal structure.

24. The method of claim 23, wherein the metal-ion conductive material has the formula $Li_{6.25}La_{2.7}Zr_2Al_{0.25}O_{12}$.

25. The method of claim 23, wherein M is a combination of Zr and Ta.

* * * * *